(No Model.)

G. C. GILL & LA MOTTE C. ATWOOD.
LANTERN.

No. 519,255. Patented May 1, 1894.

Attest:
A. M. Ebersole
Benj. A. Knight

Inventors:
Geo. C. Gill
La Motte C. Atwood
By Knight Bros
Attys

UNITED STATES PATENT OFFICE.

GEORGE C. GILL, OF CHICAGO, ILLINOIS, AND LA MOTTE C. ATWOOD, OF ST. LOUIS, MISSOURI; SAID ATWOOD ASSIGNOR TO SAID GILL.

LANTERN.

SPECIFICATION forming part of Letters Patent No. 519,255, dated May 1, 1894.

Application filed September 22, 1893. Serial No. 486,210. (No model.)

*To all whom it may concern:*

Be it known that we, GEORGE C. GILL, of the city of Chicago, in the county of Cook and State of Illinois, and LA MOTTE C. ATWOOD, of the city of St. Louis, in the State of Missouri, have invented a certain new and useful Improvement in Lanterns, of which the following is a full, clear, and exact description, reference being had to the accompanying drawings, forming part of this specification.

Our invention relates to an improved lantern, intended for use in rooms, the atmosphere of which is highly carbureted, or loaded with gas, as, for instance, in the storage rooms of distilleries, and the like; the object being to produce a lantern which will not cause the gaseous air to be ignited, thus avoiding explosion.

Our invention consists in features of novelty hereinafter fully described and pointed out in the claims.

Figure 1:
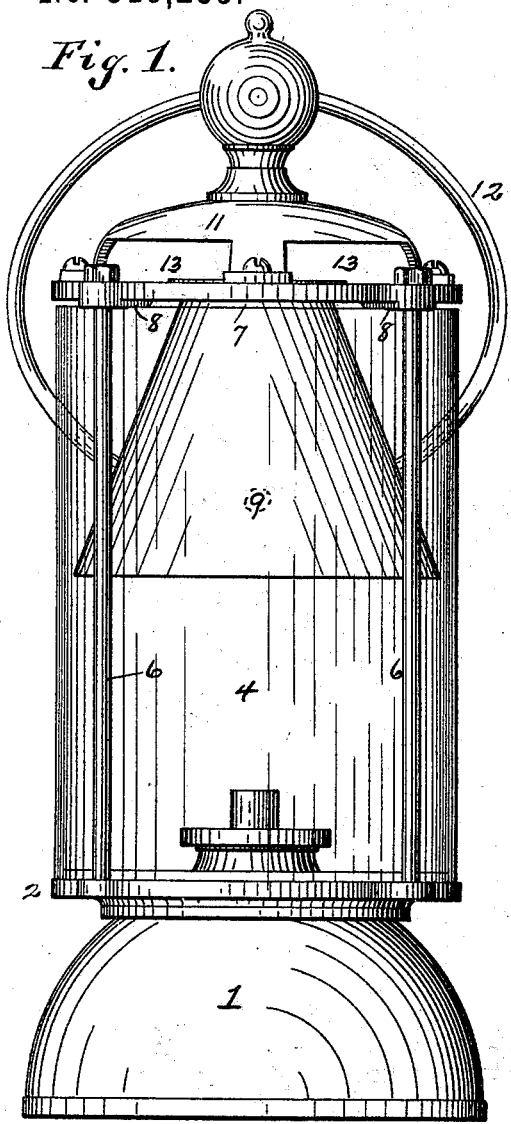
Figure 2:
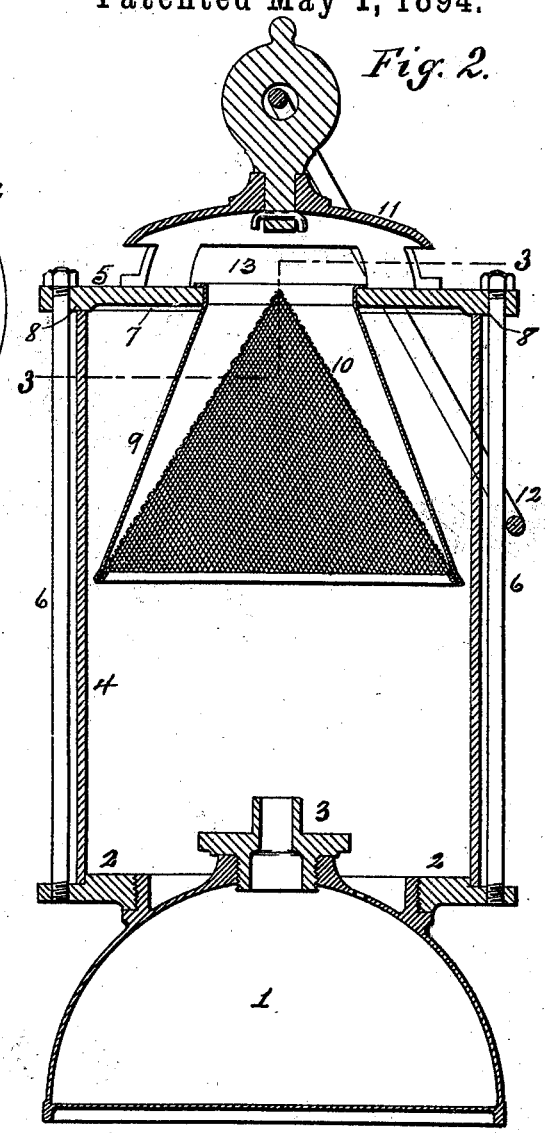
Figure 3:
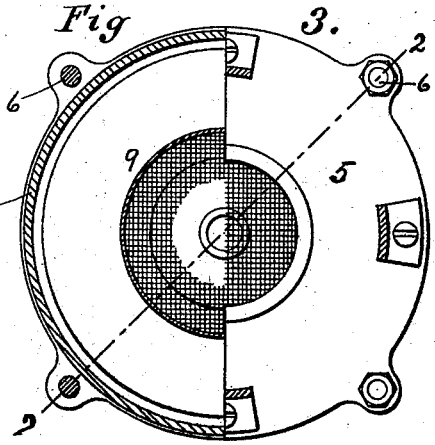

Figure 1 is a side elevation of our improved lantern. Fig. 2 is a vertical section, taken on line 2—2, Fig. 3. Fig. 3 is a horizontal, transverse section, taken on line 3—3, Fig. 2.

Referring to the drawings, 1 represents the oil cup of the lantern, which has a threaded or other air tight connection with a disk 2.

3 is the burner through which the wick passes.

4 is a glass cylinder or globe seated on the disk 2, and upon the top of which rests a cap 5 connected to the disk 2 by suitable rods 6. There is close fit between the disk 2 and the lower end of the globe, and air is thus excluded from the interior of the globe from beneath.

7 represents a space or opening between the top of the globe and the under side of the cap 5. This space is preferably made by forming a number of projections 8 on the under side of the cap, and which rest on the top of the globe, and hold the rest of the cap off of the globe, as shown clearly in Figs. 1 and 2. Oxygen, to supply combustion, enters the globe through these openings or spaces 7, and descends to the lower part of the globe, and to cause the oxygen to descend, we place a cone frustum or deflector 9 inside of the globe, and which extends down a suitable distance, preferably about half way of the length of the globe. This cone-frustum is fitted in an opening in the cap 5. The hot air arising from the burner escapes through the cone-frustum 9, and a fresh supply of air passes in through the opening 7, and is carried by the cone-frustum down into the lower part of the globe, supplying the burner with oxygen.

We place within the cone-frustum 9 a perforated, (wire gauze may be used,) cone 10, the lower end of which is of a size to fit the lower end of the cone-frustum, and the upper end of which terminates in a point near the mouth of the cone frustum. This cone acts to prevent any escape of sparks from the burner, and also serves to concentrate the heat of the burner to the center of the cone-frustum 9, thus keeping the outer walls of the cone-frustum comparatively cool, so that there will be a free downward current of air between the cone-frustum and the globe of the lantern.

The cap 5 is provided with a hood or bonnet 11, to which the ring or handle 12 is secured, and which has openings 13 to permit the free escape of the hot air, as it issues from the cone-frustum 9. By locating the air openings 7 beneath the cap 5, and inside of the periphery of the cap, the outward currents of hot air beneath the hood 11, do not interfere with the influx of cold air through the openings 7.

The spaces between the globe and the cap admit air around the edge of the globe so that the air moves downwardly around the interior surface of the globe to a point beneath the cone frustum where it supplies the flame with oxygen, the downward current of cold air being caused by the upward current of hot air through the cone frustum and hood. It will thus be seen that the gas ascends through the cone frustum and never reaches the burner.

We claim as our invention—

1. A lantern comprising a cup 1, having a disk 2 secured thereto by an air-tight joint, a globe 4 seated on the disk, a cap 5 having a central opening and air inlets at the top of the globe, rods 6 by which the cap is tied to the disk, a cone frustum 9 having its smaller end fitted in the central opening of the cap and its larger end extending about half way of the length of the globe and contiguous thereto, and a hood 11 seated on the cap having outlets 13; substantially as described.

2. A lantern comprising a cup 1, having a disk 2 secured thereto by an air-tight joint, a globe 4 seated on the disk, a cap 5 having a central opening and projections 8 by which it is supported on the globe so as to provide air inlets 7 at the top of the globe, rods 6 by which the cap is tied to the disk, a cone-frustum 9 having its smaller end fitted in the central opening of the cap and its larger end extending about half way of the length of the globe and contiguous thereto, and a hood 11 seated on the cap having outlets 13; substantially as described.

3. A lantern comprising a cup 1, having a disk 2, secured thereto by an air-tight joint, a globe 4 seated on the disk, a cap 5 having a central opening, and projections 8, by which it is supported on the globe so as to provide air inlets 7 at the top of the globe, rods 6 by which the cap is tied to the disk, a cone frustum 9 having its smaller end fitted in the central opening of the cap and its larger end extending about half-way of the length of the globe, and contiguous thereto; a perforated cone 10 within the cone frustum, and a hood 11 seated on the cap having outlets 13; substantially as described.

GEO. C. GILL.
   LA MOTTE C. ATWOOD.

In presence of—
 A. M. EBERSOLE,
 M. M. KINGSLAND.